Figure 1:
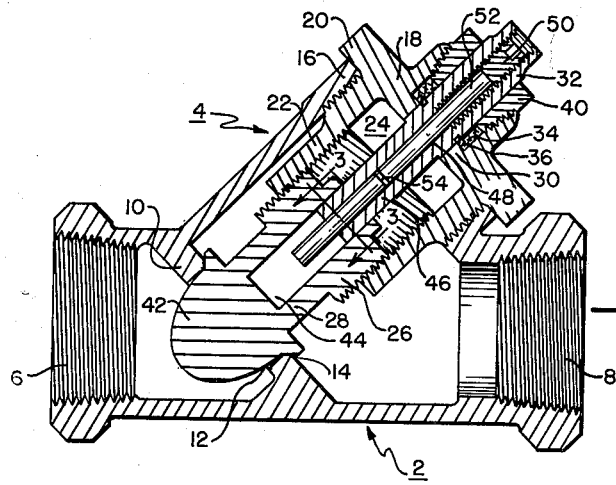

July 23, 1963

G. N. BAUSTIAN 3,098,637

BALANCING AND SHUTOFF VALVE

Filed June 23, 1960

INVENTOR.
GORDON N. BAUSTIAN

BY
Edward C. Airey

ATTORNEY

United States Patent Office 3,098,637
Patented July 23, 1963

3,098,637
BALANCING AND SHUTOFF VALVE
Gordon N. Baustian, Bettendorf, Iowa, assignor to American Air Filter Company, Inc., Jefferson, Ky., a corporation of Delaware
Filed June 23, 1960, Ser. No. 38,245
2 Claims. (Cl. 251—122)

This invention relates generally to a balancing and shut-off valve for controlling the flow of a heating or cooling medium, and relates particularly to an improved construction of a valve of this type.

The valve of the present invention finds its principal application in heating and cooling medium distribution systems of the type wherein a number of heating and cooling units are employed and it is necessary to balance the flow of the medium by restricting the flow to at least some of the units in the system.

One object of my invention is to provide a valve which may be normally set to regulate flow of the controlled medium and which, when desired, may be closed to provide a tight shut-off of flow.

Another object is to provide a valve in which, once the proper setting corresponding to the desired flow is established, limiting means may be adjusted to prevent opening of the valve beyond this setting.

Still another object is to provide such a valve constructed to afford improved flow adjusting characteristics.

These and other objects are attained in accordance with my invention wherein the valve is generally Y-shaped and includes a main body portion having an axially aligned inlet and outlet with an intermediate obliquely disposed wall defining a valve seat, and a branch body portion extending at a right angle to the seat. The branch portion is closed at its outer end by a bonnet having an internally threaded sleeve extending downwardly toward the valve seat. The flow controlling valve element includes a shaped surface inner end adapted to be moved into and out of sealing relationship with the seat and an integral outwardly directed sleeve which is externally threaded and received in the bonnet sleeve. The bore of the valve element sleeve is non-circular in cross-section and receives a valve stem inner end portion having a conforming cross-section so that rotation of the valve stem causes a corresponding rotation and proportional axial movement of the valve element. The valve stem which is of the non-rising type is hollow and contains a fitted rod having an inner end which projects downwardly past the inner end of the stem and which may be adjusted to abut the bottom of the valve element sleeve. In one preferred embodiment, the outer end of the valve stem is internally threaded and receives a threaded plug adjustable to correspondingly axially displace the rod so that when the valve element is adjusted to the desired setting, the rod may be moved to limit further opening of the valve element.

The rod is angularly grooved at an intermediate location to receive an O-ring which compresses upon insertion of the rod within the stem, and thus serves to hold the rod snugly within the stem and also serves as a seal against leakage of fluid which may get into the sleeve of the valve element.

The rod is sized in length relative to the stem length, and the stem interior threads extend sufficiently deeply, that the plug member is normally recessed into the stem when adjusted to the position limiting opening of the valve element.

Figure 2:
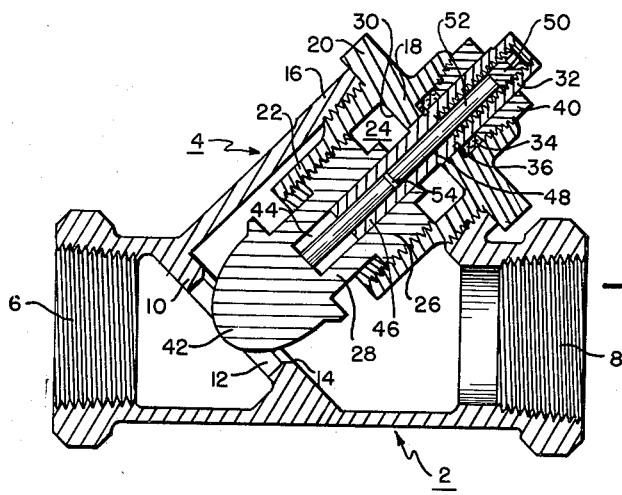
Figure 3:
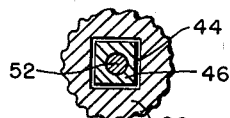

The invention will be explained in some detail in connection with the accompanying drawing illustrating a valve incorporating the inventive principles in one embodiment by way of example and wherein:

FIGURE 1 is a side elevational view in section illustrating the valve in a fully closed position;
FIGURE 2 is a side elevational view in section illustrating the same valve in a selected open position with the limiting means adjusted to prevent further opening of the valve; and,
FIGURE 3 is a sectional view taken along the line 3—3 of FIGURE 1.

Referring to the drawing, the metal valve body is of the Y-type and includes a hollow main portion 2 and a hollow branch portion 4. The main portion includes axially aligned inlet 6 and outlet 8 adapted to be connected to associated piping by means of the illustrated threads or other conventional means.

An intermediate apertured wall 10, obliquely disposed relative to the axis of the main portion, defines the annular throat orifice 12 connecting the inlet and outlet when the valve member is open, and serves as the seat 14 for the valve element.

The branch portion of the body extends perpendicularly to the oblique wall 10 and has an open end 16 provided with internal threads for receiving the correspondingly threaded bonnet 18 which sealably closes the branch portion by means of the threaded connection and outer annular shoulder 20 which sealably seats on the rim of the outer end 16.

The inwardly directed sleeve 22 of the bonnet 18 is internally threaded and forms an inner cylindrical recess or cavity 24 within which the externally threaded sleeve-like portion 26 of the valve element 28 is received. The outer end of the cavity 24 is defined by one surface of an inner annular shoulder 30 of the bonnet 18. This inner shoulder also defines an opening through which a hollow valve stem 32 passes, and the outer surface of the shoulder forms a wall of a packing recess or cavity 34.

The hollow valve stem 32 is provided with an annular groove at a selected intermediate point along its length so that a metallic clip ring 36 or the like mounted thereon will serve to slidably engage the outer surface of the bonnet inner annular shoulder 30 and thereby prevent axially inward movement of the valve stem. Leakage of fluid out of the branch portion 4 via the interior shoulder 30 of the bonnet and the outer surface of the valve stem 32 is prevented by filling the outer recess 34 with packing and screwing a packing nut 40 thereinto. With this packing arrangement pressing against the clip ring 36, the valve stem 32 is also held in a position preventing axial outward movement.

The valve element 28, which was noted heretofore as including a sleeve portion 26 received within the internally threaded sleeve portion of the bonnet, also includes an inner end in the form of a generally paraboloid shaped element 42 which is adapted to be moved into and out of engagement with the valve seat 14 in accordance with rotation in one direction and another of the valve element 28 within bonnet sleeve 22. The bore or cavity 44 of the valve element sleeve portion 26 is, as illustrated in FIG. 3, square in cross section and telescopically receives the square inner end portion 46 of the valve stem projecting inwardly from the interior shoulder 30 of the bonnet. Both the bore 44 and stem portion 46 are machined to provide a sufficiently close fit between these elements that relative axial movement therebetween occurs without binding while rotation of stem will cause a corresponding rotation of the valve member without any substantial amount of play. Any mating non-circular cross-section of stem and bore which results in a surface-to-surface power transmitting engagement may be employed to effect the desired rotation of the valve member upon rotation of the stem, but it will be appreciated that from the standpoint of simplicity of manufacturing it is desirable to provide cross sections of relatively regular configuration.

The outer end of the hollow valve stem which projects beyond the packing nut 40 is squared or similarly provided with a shape adapted to be conveniently engaged by a wrench for rotating the stem. The bore 48 of the valve stem is preferably round in cross section and for a selected axial distance adjacent the outer end of the stem internal threads are provided to accommodate a correspondingly threaded plug member such as Allen screw 50.

A circular rod 52 fits within the bore 48 of the valve stem and has an intermediate annular groove adapted to receive an O-ring 54 of neoprene or similar material. The O-ring is sized so that when the rod 52 carrying the O-ring is inserted in the bore 48, the O-ring compresses sufficiently to provide a seal against fluid leakage, but does not prevent the rod from being moved axially within the bore.

Considering now the adjustment of the valve to obtain a desired flow, and assuming that the valve is initially wide open, it is adjusted toward a closed position by rotating the valve stem in a clockwise direction to correspondingly rotate the valve element 28 in a clockwise direction and thereby move the element 42 axially inwardly toward its seat 14. As has been noted, clockwise rotation of both stem and valve element takes place without axial displacement of the stem. When the valve element has been adjusted to the position giving the desired flow, the Allen screw 50 is turned down into the valve stem to force the rod 52 downwardly until its inner end abuts the bottom end of the valve element sleeve cavity 44.

If it is later desired for one reason or another to shut off flow to the particular unit with which the valve is associated, the valve stem is rotated in a clockwise direction to cause the valve member 42 to seat. The rod 52 of course remains in its adjusted position so that when the valve is again opened, it may be opened to the previously selected position. Hence, resetting the valve to its previously established flow position after shut-off is simplified in that it only requires rotating the valve stem until it can be rotated no farther with normal force.

In accordance with one desirable feature of the invention, the lead of the threads on the valve element sleeve 26 and the cooperating internal threads of bonnet sleeve 22 is designed to provide movement of the valve member between extreme open and closed positions in about 330° to 360° of stem rotation. This permits more easily achieved accuracy in balancing a system containing the inventive valve than a system containing certain conventional valves requiring, e.g., 90° rotation to operate the valves between extreme positions. The paraboloid shape of the inner end element 42 also lends itself to achieveing sensitivity in balancing by virtue of a flow variation response which, through an extended part of the stem rotation range, is proportional to the stem rotation and which is not too far removed from a linear response.

In accordance with the preferred construction of the valve, the plug member 50 is recessed within the stem and is in the form of an Allen screw or similar element which requires a special implement to effect rotation. Thus, non-authorized individuals will neither readily observe the element 50 which must be backed out of its position to permit opening the valve beyond its selected opening, nor fiind it easy to do so without a special tool.

The invention claimed is,

1. In a balancing and shutoff valve construction: a hollow body having a main portion including an inlet port and an outlet port and an intermediate obliquely disposed wall defining a valve seat, and having a branch portion extending at a right angle to said obliquely disposed wall; a valve bonnet enclosing the open end of said branch portion and having an internally threaded sleeve projecting into said branch portion; a valve element including an unbroken generally paraboloid shaped working surface end adapted to be moved into and out of engagement with said valve seat and a hollow sleeve portion extending outwardly into said branch portion and being externally threaded for engagement with said internal threads of said bonnet sleeve, the bore of said hollow sleeve portion being of non-circular cross section; a hollow stem projecting through said bonnet in sealed relationship and having an inner end slidably projecting into said valve element bore, said inner end being of a non-circular cross section to substantially conform to said valve element bore cross section whereby rotation of said stem causes a corresponding rotation of said valve element and proportional axial displacement of said valve element relative to said seat; slip fitted rod means in said hollow stem bore and having its inner end projecting into said hollow sleeve portion of said valve element for engaging said valve element upon predeterminde movement thereof away from said seat, said rod means including an intermediate annular groove receiving an O-ring compressed within said hollow stem; and separate adjustable means, in the form of a plug member, unattached to said rod means, threadably received and recessed within said stem outer end for axial displacement therewithin to correspondingly displace said rod means, whereby movement of said valve element away from said seat is selectively limited.

2. In a balancing and shutoff valve construction: a hollow valve body having an inflow passage and an outflow passage axially aligned and an intermediate interior web defining an annular valve seat normal to an oblique angularly projecting body portion; a bonnet mounted on said projecting portion and having a sleeve projecting inwardly into said body to define a cylindrical recess provided with internal threads; a valve element including an unbroken generally paraboloid shaped working surface end adapted to be moved into and out of sealing relationship with said valve seat, and an externally threaded opposite sleeve-like end received in said cylindrical recess so that rotation of said valve element in one direction and another effects axial movement thereof toward and away from said seat; a hollow valve stem having one end projecting out of said bonnet for engagement by means for rotating said stem, and extending in rotatably sealed and non-rising relationship through said bonnet with the inner end of said stem extending into said valve element sleeve-like end and having a cross-section adapted to engage for rotation the inner surface of said sleeve like end while permitting relative axial movement therewith; rod means disposed in said hollow stem and having its inner end projecting into said valve element sleeve-like end, said rod means including an intermediate annular groove receiving an O-ring compressed within said hollow stem; and a separate plug member, unattached to said rod means, threadably received and recessed within the outer end of said stem, said plug member being axially displaceable upon rotation thereof relative to said stem for adjusting the axial disposition of said rod means relative to said stem whereby axial movement of said valve element away from said seat is correspondingly limited.

References Cited in the file of this patent

UNITED STATES PATENTS

| 1,169,306 | Valmore | Jan. 25, 1916 |
| 1,353,053 | Lavigne | Sept. 14, 1920 |

FOREIGN PATENTS

| 318,186 | Italy | of 1934 |
| 548,382 | Belgium | of 1956 |
| 557,168 | Italy | of 1957 |